(12) United States Patent
Crosato

(10) Patent No.: US 11,512,270 B2
(45) Date of Patent: Nov. 29, 2022

(54) APPARATUS AND METHOD FOR LOADING A PLANT PRODUCT INSIDE A FERMENTATION TANK

(71) Applicant: NOFORM SRL, Meolo (IT)

(72) Inventor: Bruno Crosato, Meolo (IT)

(73) Assignee: NOFORM SRL, Meolo (IT)

( * ) Notice: Subject to any disclaimer, the term of this patent is extended or adjusted under 35 U.S.C. 154(b) by 606 days.

(21) Appl. No.: 16/078,018

(22) PCT Filed: Feb. 25, 2017

(86) PCT No.: PCT/IB2017/051106
§ 371 (c)(1),
(2) Date: Aug. 21, 2018

(87) PCT Pub. No.: WO2006/079987
PCT Pub. Date: Aug. 3, 2006

(65) Prior Publication Data
US 2019/0055504 A1 Feb. 21, 2019

(30) Foreign Application Priority Data

Feb. 26, 2016 (IT) .................. 102016000020430

(51) Int. Cl.
C12G 1/00 (2019.01)
C12G 1/022 (2006.01)
C12C 11/06 (2006.01)
C12H 1/22 (2006.01)
B30B 9/02 (2006.01)
B30B 15/00 (2006.01)
B30B 15/30 (2006.01)

(52) U.S. Cl.
CPC ............... *C12G 1/005* (2013.01); *B30B 9/02* (2013.01); *B30B 15/00* (2013.01); *B30B 15/30* (2013.01); *C12C 11/06* (2013.01); *C12G 1/0203* (2013.01); *C12H 1/22* (2013.01)

(58) Field of Classification Search
CPC .. C21G 1/005; B30B 9/02; B30B 9/04; B30B 9/042; B30B 9/06
See application file for complete search history.

(56) References Cited

U.S. PATENT DOCUMENTS

| 4,473,011 A | 9/1984 | Wuschek |
| 4,730,555 A * | 3/1988 | Blanchot ............... B30B 9/06 100/37 |
| 9,493,298 B2 * | 11/2016 | Evans ............... B30B 9/262 |

FOREIGN PATENT DOCUMENTS

| EP | 2060624 A1 * | 5/2009 | ............... C12G 1/02 |
| EP | 2380968 A1 * | 10/2011 | ............. C12G 1/005 |

* cited by examiner

*Primary Examiner* — Matthew Katcoff
(74) *Attorney, Agent, or Firm* — Mark M. Friedman

(57) ABSTRACT

A method is described for loading a plant product, preferably must or grape, inside a fermentation tank (12) comprising on its top a loading mouth (14), comprising the steps of:
moving a quantity of plant product by putting it inside a container (50) coupled to a guide (22) arranged to guide it up above the loading mouth and, there, and transferring said amount inside the tank.
The method ensures easy handling of the product.

23 Claims, 3 Drawing Sheets

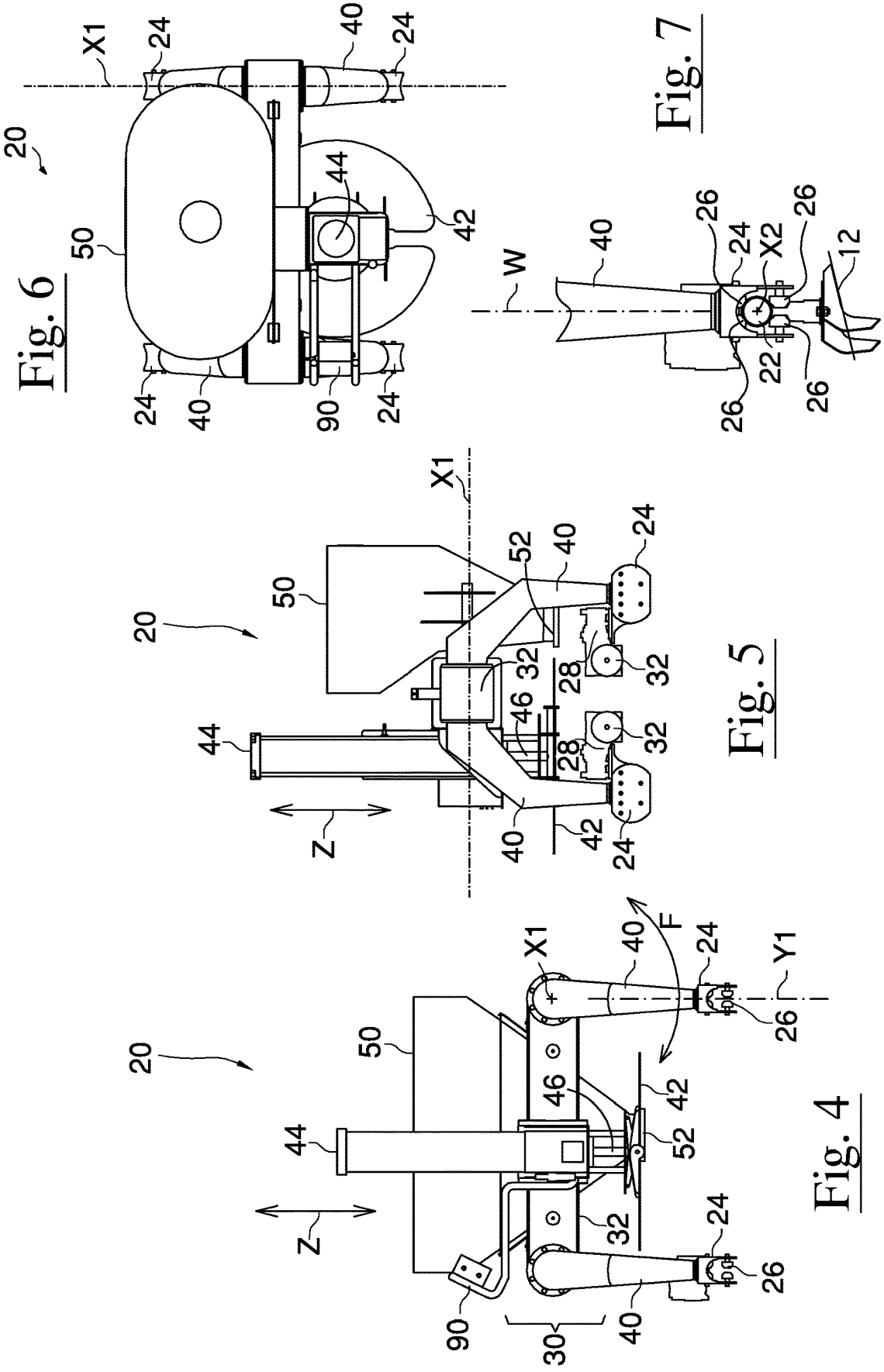

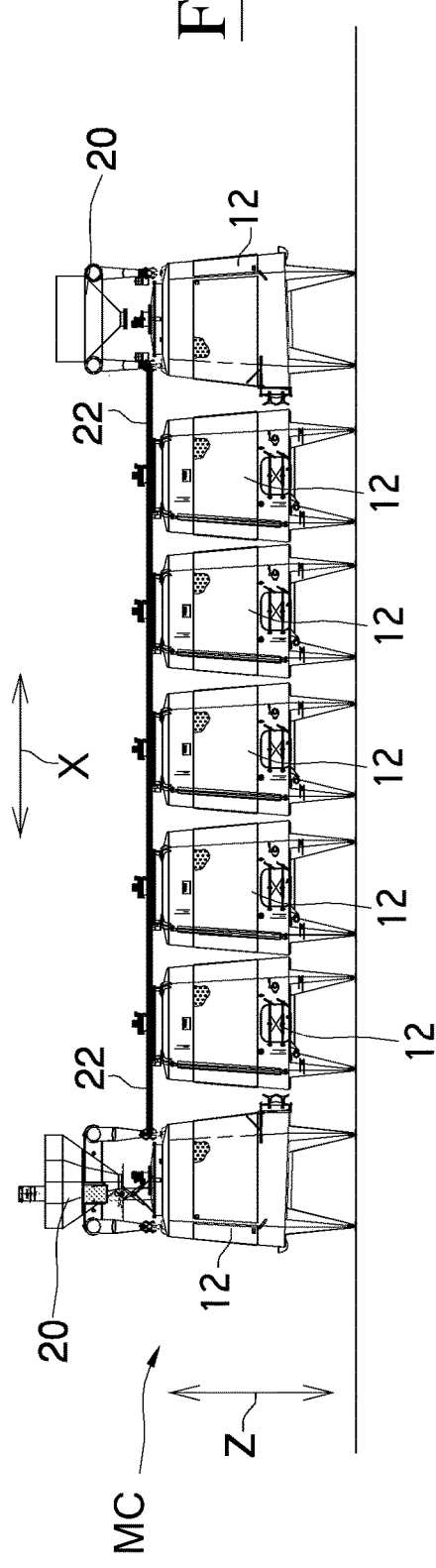
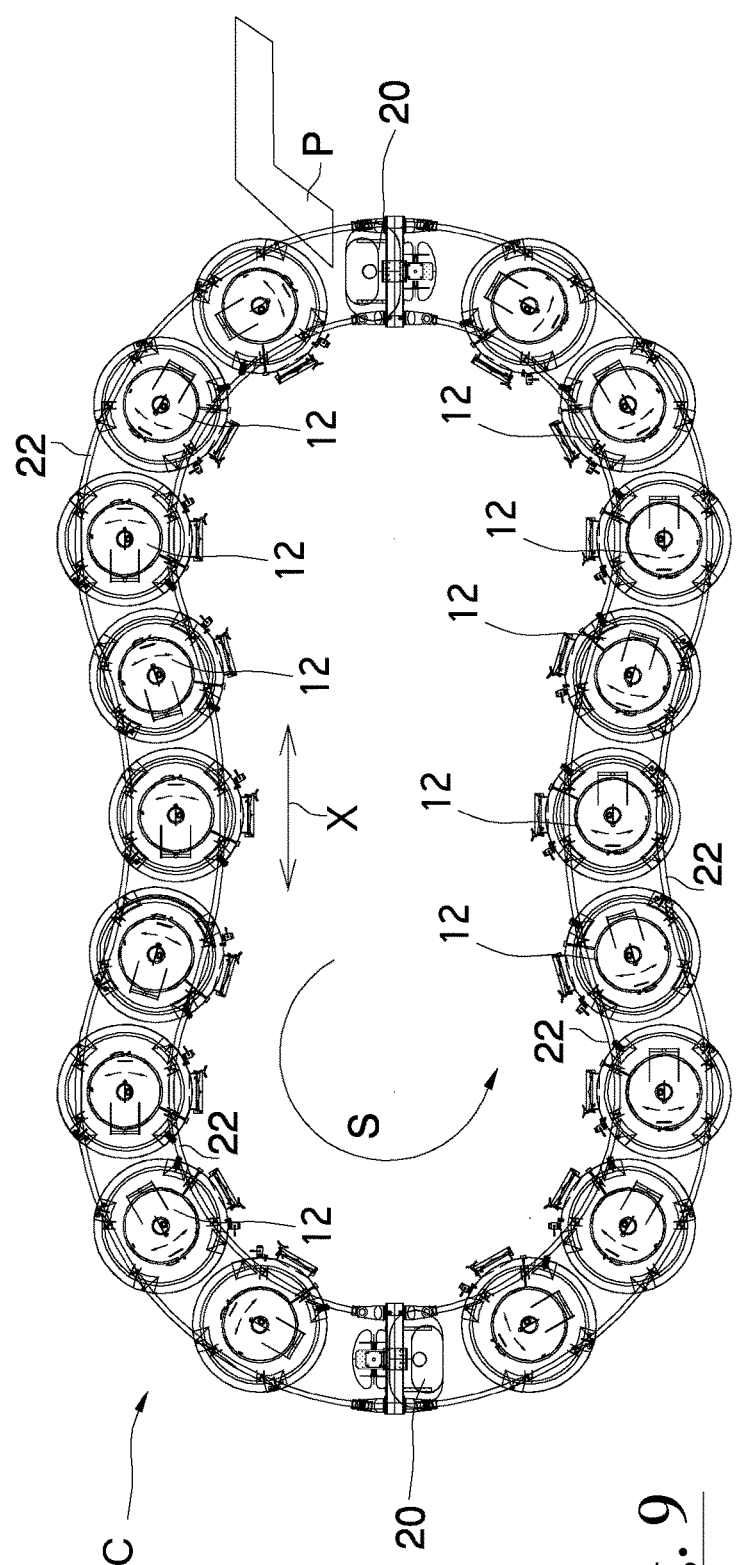

APPARATUS AND METHOD FOR LOADING A PLANT PRODUCT INSIDE A FERMENTATION TANK

The invention relates to an apparatus and method for loading a plant product, e.g. in the form of crushed material and/or grains and/or bunches, inside a fermentation tank. The description that follows will refer by way of example to winemaking, sector in which the invention proved particularly effective.

The recipe for a winemaking would require as a first step to be able to bring the grapes into the fermentation tank without letting it oxidize and without mechanical damage by pumps or crashing. It is known indeed that an aggressive grape treatment determines the extraction of substances that have a negative impact on wine quality. A similar problem is solved by EP2380968 but only for the transfer from the tank to a press.

Often the known loading systems are bulky, unsophisticated, and not modular at all. In short, they force those who have many tanks to be loaded to arrange a large additional space in which to place the loading means.

The present invention has for object the realization of an apparatus and method for loading a plant product, e.g. in the form of crushed material and/or grains and/or bunches, inside a fermentation tank that improves this state of art.

A first aspect of the invention is a method for loading a plant product, preferably must or grape, inside a fermentation tank comprising on its top a loading mouth, comprising the steps of:

moving a quantity of plant product by putting it inside a container coupled to a guide arranged to guide it up above the loading mouth and there (that is, at that point, above said mouth) transferring (e.g. unloading by gravity in order to save energy and components) said amount into the tank.

In this way the plant product comes quickly and protected to the tank, into which it can be poured just as quickly. The wine-making process is improved by reducing the risk of oxidation of the plant product, because after harvest it does not rest much time in open-air at the winery; and the load operation is simplified and improved, which takes place quickly and without mechanical stress on the plant product to inlet it inside the tanks. Even the exploitation of the available space in a winery improves, because the guide so arranged avoids having troubles with many tanks to load.

Below some variants, to be used alone or in combination with each other.

Advantageously, one or more containers may be handled by making them move exclusively along a plane which stands above the top of one or more tanks; e.g. exclusively along a plane orthogonal to the direction of the gravity force, with the advantage of avoiding to tilt the plant product and make it overflow.

Advantageously, by moving along a closed-ring path one or more containers, N aligned tanks (N>=2) can be loaded or a tank of them can be loaded with sequential unloading from several containers. To this aim, the guide forms preferably a closed-ring path.

Advantageously, in a point of the path there may be established for the plant product a (e.g. unique) gathering point, wherein the plant product is gathered and from which it is distributed into the containers; and a caravan of containers is formed, wherein each container of the caravan is loaded with plant product only at the gathering point,
travels along the guide to a designated tank to be loaded,
unloads the product therein, and
continues along the guide returning to the gathering point for another load.

Another aspect of the invention, which shares the advantages of the first, is an apparatus or system for loading a plant product, preferably must or grape, inside a fermentation tank comprising a loading mouth on its top, comprising:

a container for the transport of a quantity of plant product;
a guide (e.g. raised from ground),
the container being supported and guided by the guide so as to make it arrive above the loading mouth for unloading there (e.g. by gravity) said quantity.

Below some variants, to be used alone or in combination with each other.

Advantageously, the guide is preferably made to lie exclusively along a plane standing above the top of a plurality of tanks, to avoid level oscillations for the container. In particular, it is preferred that the guide lies exclusively on a plane orthogonal to the direction of the gravity force.

In particular, if one wants the container to efficiently serve a plurality of tanks, they preferably have the top and/or the loading mouth at the same height, or the plurality of tanks preferably has the top and/or the loading mouth that substantially lie on a same plane, preferably horizontal.

Advantageously, preferably N tanks (N>=2) aligned in a row may be loaded if the guide comprises or is constituted by a track to which at least one container is slidingly coupled. Advantageously the guide or track forms a closed circuit or ring for the container, the closed circuit or ring being so configured as to allow the displacement of the container, starting from a point, circularly along the guide in one direction so as to make it arrive at the same point from an opposite direction.

Advantageously, on the guide there are preferably installed two or more containers, to load several tanks simultaneously or load one with sequential unloading from more containers. This is facilitated by the circular movement of the containers along the track. In particular a point of the track may coincide with the (only) gathering point for the plant product (see also its definition given above for the method): therefore a caravan of containers may be organized that are loaded with plant product at the gathering point,
travel along the track up to the designated container to be loaded,
unload there the product, and
proceed along the track back to the gathering point for another load.

For the method and/or the apparatus, preferably:

the guide comprises or is constituted by rails or straight and/or curved tracks, for simplicity only two; and/or the rails or tracks form a closed path or circuit, having for example circular or oval plan, for the advantages said above; and/or the rails or tracks, for simplicity of construction, rest on top of one or more tanks to be loaded, but they could e.g. be mounted on the walls or floor of the winery; and/or the guide has an extension greater than the plan of a tank and has curved path, so that it is adapted to connect the top of two or more tanks, aligned or not, thereby allowing the container to slide from one to the other and/or to reach a raised point; and/or a container comprises or consists of a hopper (by hopper here it is meant in general a device or a container used for the unloading, by gravity, of the crushed material inside the underlying tank). The hopper may be constituted by a truncated-pyramid or cone shaped container or housing, where the smaller bottom base is equipped with a closable opening by a hatch, closable manually or preferably by a drive controlled by a control unit. The container or housing can also comprise a non-closable permanent opening); and/or a container comprises a crushing and/or destemming stage placed on the bottom or at the outlet of the hopper or container, so as to crush the plant product while it is being loaded into a tank. Advantageously, associated with said stage there may be a mechanism capable of generating vibrations in the hopper, so as to facilitate the flow of the plant product toward said stage.

It is known that with the fermentation of the must a layer of marc floating above the must forms, called the cap. The cap touches the must only at is base while the production of good wine envisages for the extraction of aromas and color from all of its mass; that's why the cap is needed to be broken and sank periodically.

A plunging plunger system is known from EP 2060624, and comprises a piston which pushes a blade or a disc inside a tank and which can slide on rectilinear rails placed on top of several tanks to allow reaching each one. A limitation of this system is that the plunger's shift can only occur on straight rails, while from wineries' requirements often the need to move a plunger on curved paths may arise.

With the present invention one can obtain a plunging apparatus that improves the one in EP 2060624, in particular to simplify the operation of crushing and plunging and/or with which small wineries will be best served, where space is scarce and equipment must keep costs minimal.

The problem is solved by the apparatus where one or each said container comprises a plunging piston, being able to then further exploit the mobility of the containers over the tanks to plung a or each tank previously loaded with plant product.

In relation to the ability of plunging, a preferred variant of the apparatus, is that a or each container comprises means for servo-assisting the vertical movement of the plunging rod or to move the plunging rod.

For the method, the apparatus or the said container, there can be these variants:

- the apparatus, or a or each container, comprises a programmable device which is adapted to control the driving means so as to move automatically and/or with predetermined movements the container and/or adapted to control the means for servo-assisting said plunging rod and/or adapted to control means or mechanisms onboard the container, like e.g. the closing/opening of the bottom of the container or of said hopper (that is, for the unloading of the plant product) and/or of an airtight hatch (see below) and/or the injection (timings, intervals, flow rate) of inert gas in the container or in the hopper; and/or
- a or each container comprises driving means to move the container along said guide (to avoid efforts to the operator);
- a or each container comprises in particular a drive means coupled to a wall movable on the bottom of the container or hopper for opening/closing the bottom of the container or hopper in order to unload vertically the plant product (to facilitate the unloading operation); and/or
- a or each container comprises an auxiliary tank containing (preferably inert) gas and means for injecting the gas into the container or inside the hopper (to avoid the oxidation of the transported plant product); and/or
- a or each container comprises an inlet through which to inject inert gas inside it; and/or
- a or each container is hermetically closable by means of an airtight lid.

Note that to avoid oxidation of the plant product during the transportation, it is not essential that said container or hopper is a closed or lockable container: one can take advantage of an inert gas such as $CO_2$ which, weighting more than air, deposit on the bottom of the object that contains it. Then one needs to just inject $CO_2$ into the container after it has been filled so that the $CO_2$ forms an insulating and anti-oxidant film above the plant product and behave in practice as a virtual lid for the container.

With or without the plunging piston, the container advantageously may be built to move easily on curved rails. This capacity is preferably obtainable if a or each container comprises a central body, which e.g. supports the plunging piston (when present), and two legs extending from the central body and having their ends engageable on the guide, one or each of the two legs being hinged on the central body to oscillate about an axis which is (in use) horizontal and substantially orthogonal to the direction of translation of the piston; and/or two pairs of legs extending from the central body, a pair for side, one or each pair being hinged on the central body for oscillating about an axis in use horizontal and substantially orthogonal to the piston's travel direction; and/or the hinged legs of a pair are oscillating independently from one another, or connected or connectable integrally with each other to swing together; and/or the legs comprise at their free ends conical wheels engageable on the guide.

A third aspect of the invention, which shares the advantages of the first and second, is a container for plant product as defined above and in the following. The advantages of the container are mainly:

fast transportation and/or without oxygenation of the crushed material into the fermentation tank; and/or absence of mechanical pumps; and/or the supply of unaligned tanks.

A fourth aspect of the invention, which shares the advantages of the second and the third, relates to a system for the plunging treatment of a plant product, preferably in the form of crushed grapes or must or grains, comprising:

a series of fermentation tanks to contain and to ferment the plant product, two rails, which are fixed on the top of the fermentation tanks and have a curved segment or path;

a container which comprises a plunging piston and is made according to one of the preceding variants.

A fifth aspect of the invention, which shares the benefits of the third and fourth, relates to a plunging method of a plant product, preferably in the form of crushed grapes or must or grains, contained in a fermentation tank, with the steps of transporting the plant product above a fermentation tank through a hopper or container comprised in a container equipped with a plunging piston and sliding on rails placed on top of the tank, waiting for the formation of a floating cap in the tank;

sinking the cap with the plunging piston.

A sixth aspect of the invention, which shares the advantages of the second, is an installation to ferment a plant product, preferably must or grapes, comprising:

a plurality of fermentation tanks each comprising a loading mouth on the top;

one or more tanks for the transport of a quantity of plant product;

a guide raised from the ground and mounted on top of the tanks, the guide being configured for supporting and guiding the containers so as to make them arrive over each loading mouth for unloading therein (e.g. by gravity) said quantity.

In the installation the guide and/or the container can take advantage of one or each variant defined above for the other aspects of the invention.

To illustrate even better the advantages of the invention, preferred embodiments thereof are now described with reference to the attached drawing, where FIG. 1 shows a side view of a winemaking tank;

FIG. 4 shows a side view of the plunging apparatus in FIG. 1;

FIG. 5 shows a front view of the plunging apparatus in FIG. 4;

FIG. 6 shows a plan view of the plunging apparatus in FIG. 4;

FIG. 7 shows a magnification of a detail of the plunging apparatus in FIG. 1 (circle C1);

FIG. 8 shows a side view of a fermentation installation;

FIG. 9 shows a plan view of installation of FIG. 8.

In the figures identical numbers indicate equal parts. Not to crowd the drawing, sometimes not all identical elements are numbered.

Figure 3:
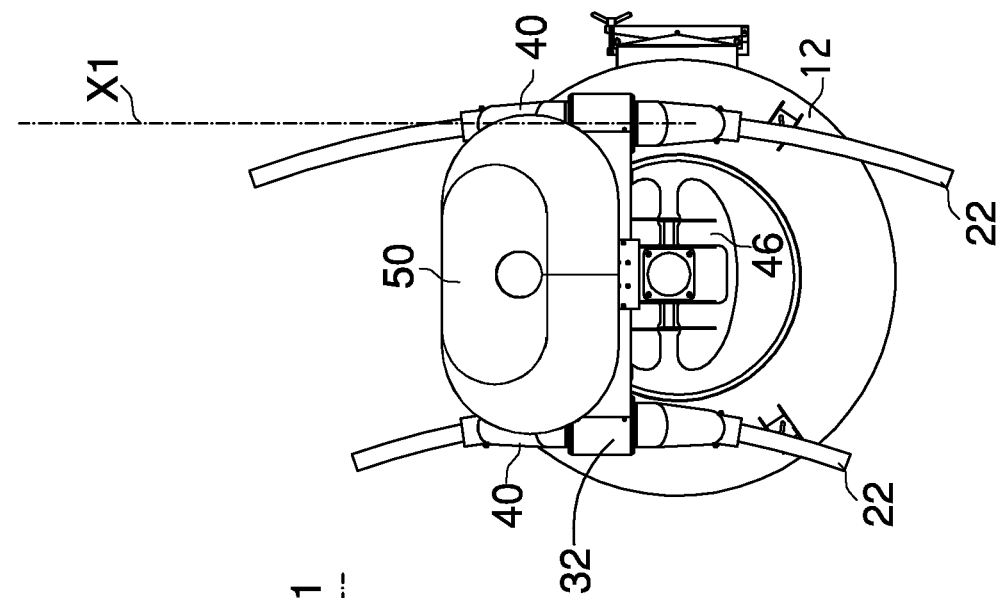
FIG. 3 shows a plan view of the tank of FIG. 1.
Figure 1:
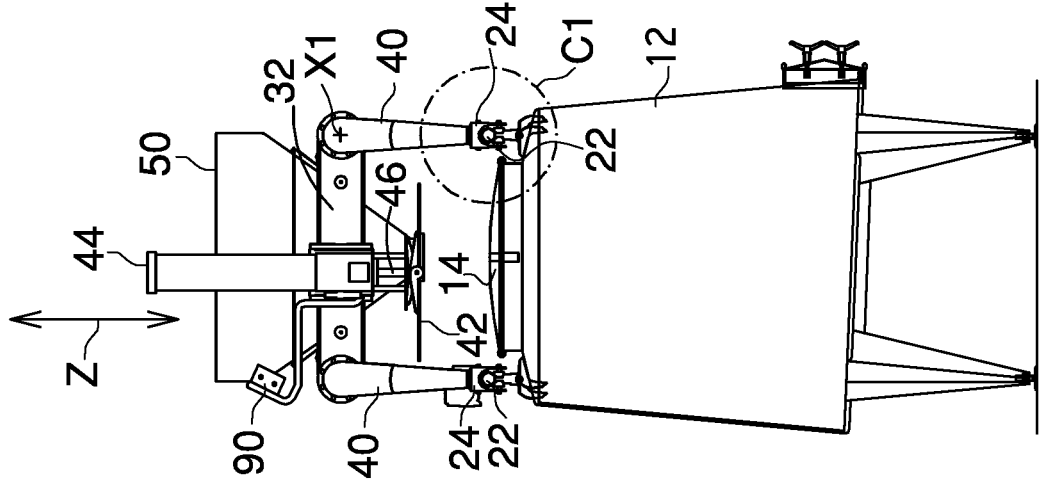

In FIG. 1 there is shown a winemaking apparatus which comprises a known fermentation tank 12 on top of which are fixed, symmetrically one on each side of the tank 12 and to the sides of a top manhole 14, two rails 22 for a device 20. As seen in FIGS. 3, 8 and 9, the rails 22 are curved and comprise curved sections, although not necessarily. The fixing of rails 22 to the tank 12 can be made e.g. as described in EP 2,060,624.

The apparatus is part of a, installation MC composed of a plurality of tanks 12, see FIGS. 8 and 9. In the example the tanks 12 are arranged along a ring 20 and the rails 22 form two concentric closed rings that overhang the ring of tanks 12. On the rails 22 there are movable one or more devices 20 (as an example, two in FIGS. 8 and 9). Since the rails 22 extend over a plurality of tanks 12, the device 20 can serve them all.

Figure 2:
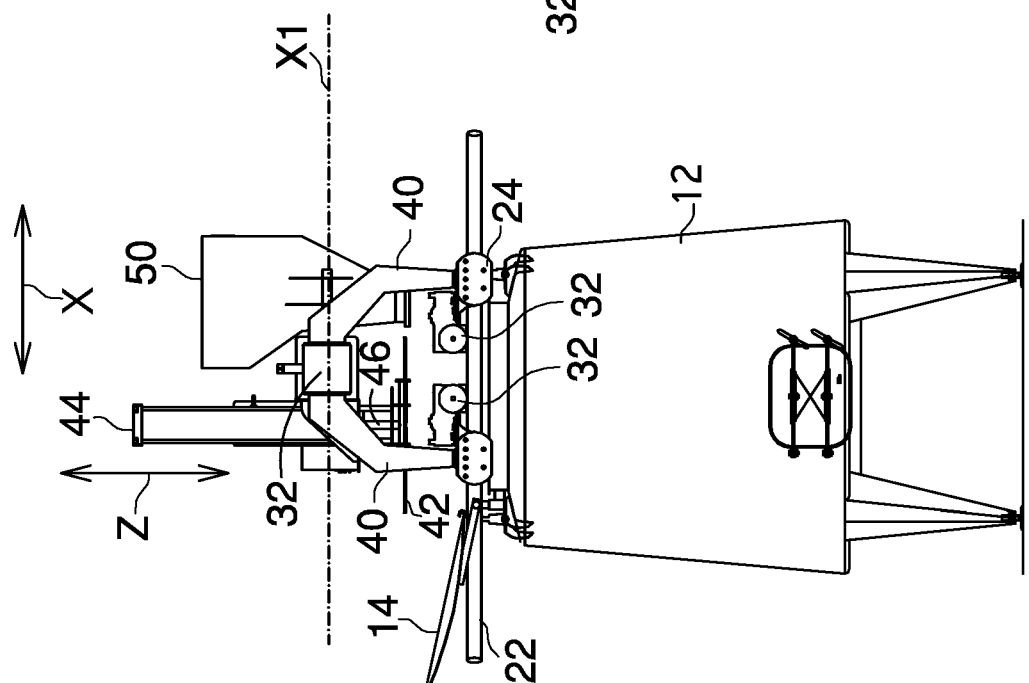
FIG. 2 shows a front view of the tank of FIG. 1.

A device 20 comprises a central body 30, e.g. with a horizontal beam 32, to which are connected four legs 40, two for each side of the body 30, which comprise at their free end skids or carriages 24, equipped with conical wheels 26. Each skid 24 engages with its own wheels 26 a rail 22 (see FIG. 7), so that the device 20 as a whole can move horizontally on the rails 22 remaining over each tank 12. The device 20 may be driven manually or, preferably, is motorized to move on the rails without efforts for the operator. For this purpose it may include optional driving means mounted on a skid 24 and comprising a motor 28 adapted to rotate a wheel 32 which engages the upper surface of a rail 22 (see. FIG. 2).

On the body 30 is mounted a hopper 50 having a bottom manhole 52, controllable manually or using a drive. The hopper 50 may be loaded e.g. with crushed material (or whole grapes) and transport it over a tank 12, inside which then unload it directly by opening the manhole cover 52. In this way the transfer time inside the tank 12 is shortened and crushed material's prolonged exposure to air is avoided. To improve the latter effect, preferably the hopper 50 is hermetically closable, in order to form an air-tight environment or repaired for the crushed grapes, and/or comprises an inlet (not shown) for inert gas. The gas is fed into the hopper 50 water-tightly, and reduces oxidation of the crushed grapes. Preferably, the gas is taken from a source (not shown) onboard the device 20, so as to make it independent of, and avoid connections to, the rest of the winery.

From the foregoing, it appears that each device 20 has individually the ability to move along a horizontal plane (see arrow X) above each tank 12 (FIG. 8) being able to place itself, moving on the rails 22, above the upper mouth of each tank 12 to unload thereinto the contents of the hopper 50.

In particular, establishing a plant product accumulation and distribution point P somewhere along the rails 22, a hopper 50 may be loaded at point P, unloaded into a tank 12 and return to the point P for another load in the same direction along the rails 22. See the direction of movement S. Thus on the rails 22 there can be formed also a convoy of devices 20 to load sequentially the tanks 12, where the circular shape of the path made by the rails 22 (and thus induced for the devices 20) avoids to inefficiently move back and forth a device 20.

It is clear, then, the advantage that the device 20 also allows the travel on curved rails 22. For this aim, at least two of the legs 40 are hinged and not fixed to the body 30. The pivoting takes place around a horizontal axis X1, perpendicular to the Z direction (see below) and parallel to the plane or direction X. In this way, two legs 40 are capable of oscillating (arrow F in FIG. 1) relative to the body 30 (and to the beam 32) and adjust instantaneously the distance between the skids 24 to the curvature of the rails 22. To this aim, the skids 24 may be articulated at the ends of the legs 40 or idly rotatable about a vertical axis Y1 (or parallel to the length of the legs 40 or parallel to the axis Y).

FIG. 7 shows a detail of the preferred coupling between the skid 24 and a rail 22 mounted on top of a tank 12.

Each skid 24 comprises four conical wheels 26, two by two facing opposite along one the same axis (in use) horizontal and two by two lying on two axes (in use) horizontal and parallel to each other. The taping of the wheels 26 is turned towards the opposite wheel 26, and the distance (spacing) between the two pairs of opposing wheels 26 is slightly greater (approximately twice) than the diameter of the rail 22. In this way between the wheels 26 there will form an empty space to trap snugly the rail 26. After assembly, the wheels 26 engage the rail 22, two the upper surface and two the lower surface. Not only this avoids the skid 24 from detaching from the rail 22, but the skid 24 can rotate about the axis X2 of the rail 22, when the relative leg 40 tilts during a curve, without losing grip.

As a further improvement, in a or each device 20 there is preferably mounted a plunging rod or piston 46 which is lowerable vertically and is equipped with a plunging plate 42. The rod or piston 46 is linearly displaceable by an actuator 44, e.g. pneumatic or hydraulic.

The result is that each device 20 has a rod 46 with the ability to locate, moving on the horizontal axis X, above each tank 12 and to move along a vertical line (see arrow Z). The rod 46 can thus be positioned, by moving on the rails 22, above the upper mouth of each tank 12 to descend inside it. With only one device 20 you can thus plung each tank 12 of the installation MC, or with various devices 20 one can be quickly plung in parallel all the tanks 12 of the installation MC.

The device 20 preferably comprises an electronic or pneumatic control unit 90 to control its functions.

The control unit 90 may e.g. control the actuator 44 for the motion of the rod 46, and/or the driving means to operate the wheels 32; and/or the actuator of the hatch 52, and/or the injection of inert gas into the hopper 50 (e.g. by driving valves and/or pumps onboard the device 20); and/or the airtight sealing organs of the hopper 50;

the organs for closing/opening the bottom of the hopper 50.

As inert gas one can use $CO_2$, nitrogen or dry $CO_2$.

It is clear then that with great productivity the device 20 not only allows the loading operations for an array of N tanks 12, also not aligned, but also the fully automated plunging.

The arrangement of the tanks 12 may vary from what is illustrated, as well as the path of the rails 22.

The invention claimed is:

1. Apparatus or system (MC) comprising:
   a container for the transportation of a quantity of plant product, in the form of must, said container being so adapted that said quantity of the plant product can be put inside said container to be moved,
   a plurality of fermentation tanks, each comprising a loading mouth on its top,
   a guide configured to support and guide the container so as to make it arrive over the loading mouth of each of said plurality of fermentation tanks for unloading therein said quantity, wherein the guide is made to lie only along a plane overlying the top of the plurality of tanks, the plane being orthogonal to the direction of the force of gravity,
   wherein said container is configured to move horizontally along said guide, passing sequentially over the tops of said plurality of fermentation tanks,
   said container comprising a plunging piston to plunge the plant product, a central body and at least two legs which extend from the central body and have the ends engageable on the guide,
   one or each of the two legs being hinged on the central body to oscillate about an axis in use horizontal.

2. An apparatus or system according to claim 1, wherein each of the plurality of tanks has the top and the loading mouth at the same height.

3. The apparatus or system according to claim 1, wherein the guide forms a closed circuit or ring for the container, the closed circuit or ring being configured so as to allow the displacement of the container, starting from a point, circularly along the guide towards one direction and thus make it arrive at the same point by an opposite direction.

4. An apparatus or system according to claim 1 comprising a plurality of said containers, wherein the guide comprises or is constituted by a track to which at least one container of said plurality of containers is slidingly coupled.

5. An apparatus or system according to claim 1, wherein the guide comprises rails or tracks which form a closed track or circuit, which is circular or oval in plan, the rails or tracks resting on the top of one or more tanks to be loaded.

6. An apparatus or system according to claim 1, wherein said container comprises or is constituted by a hopper.

7. An apparatus or system according to claim 1, wherein said container is hermetically closable by means of an airtight lid.

8. Apparatus or system according to claim 1, wherein said container comprises means for servo-assisting the vertical movement of the plunging piston provided in said container.

9. Apparatus or system according to claim 1, wherein said container comprises an actuator means coupled to a movable wall on the bottom of the container for opening/closing the bottom of the container in order to unload vertically the plant product.

10. Apparatus or system according to claim 1 wherein one or each of the two legs is hinged on the central body to oscillate about an axis in use horizontal and substantially orthogonal to the a translation direction of the piston.

11. Apparatus or system according to claim 1, wherein said at least two legs comprises two pairs of legs which extend from the central body, a pair for each side, one or each pair being hinged on the central body to swing about an axis in use horizontal.

12. Installation to ferment a plant product, in the form of must, comprising:
    a plurality of fermentation tanks each comprising a loading mouth on the top:
    one or more containers for the transportation of a quantity of plant product, each container being so adapted that said quantity of plant product can be put inside said container to be moved,
    a guide raised from the ground and mounted on top of the fermentation tanks, the guide being configured to support and guide the containers in order to make them arrive get over each loading mouth for therein unloading said quantity, wherein the guide is made to lie only along a plane overlying the top of the plurality of tanks, the plane being orthogonal to the direction of the force of gravity,
    wherein said container is configured to move horizontally along said guide, passing sequentially over the tops of said plurality of fermentation tanks,
    said container comprising a plunging piston to plunge the plant product, a central body and at least two legs which extend from the central body and have the ends engageable on the guide,
    one or each of the two legs being hinged on the central body to oscillate about an axis in use horizontal.

13. Apparatus or system according to claim 1, wherein said legs comprise at their free ends conical wheels engageable on the guide.

14. Apparatus or system according to claim 6, wherein said hopper is constituted by a truncated-pyramid or cone-shaped container or housing with a smaller bottom equipped with a closable opening by a hatch.

15. Apparatus or system according to claim 14, wherein said closable opening is closable manually or by a drive controlled by a control unit.

16. Apparatus or system according to claim 6, wherein said hopper comprises an auxiliary tank containing inert gas and means for injecting the gas into the hopper.

17. Apparatus or system according to claim 11, wherein the hinged legs of a pair is mounted oscillating independently from each other.

18. An apparatus or system according to claim 11, wherein the hinged legs of a pair is or connected or connectable integrally with each other to swing together.

19. An apparatus or system according to claim 11, wherein said container comprises a plunging piston to plunge the plant product.

20. An apparatus or system according to claim 11, wherein said two pairs of legs are hinged on the central body to swing about an axis in use substantially orthogonal to a translational direction of the piston.

21. Apparatus or system according to claim 11, wherein said container comprises or is constituted by a hopper, and said hopper comprises an auxiliary tank containing inert gas and means for injecting the gas into the hopper.

22. Apparatus or system according to claim 1, wherein the apparatus, or said container, comprises driving means to move the container along said guide, said driving means being controlled electronically or pneumatically.

23. Apparatus or system according to claim 22, wherein the apparatus, or said container, comprises a programmable device which is adapted to control the driving means so as to move automatically and/or with predetermined movements the container.

\* \* \* \* \*